United States Patent
Watanabe (10) Patent No.: US 8,008,597 B2
(45) Date of Patent: Aug. 30, 2011

(54) SHEET POST-PROCESSING APPARATUS (75) Inventor: Koki Watanabe, Moriya (JP)

(73) Assignee: Canon Kabushiki Kaisha (JP)

( * ) Notice: Subject to any disclaimer, the term of this patent is extended or adjusted under 35 U.S.C. 154(b) by 589 days.

(21) Appl. No.: 11/778,595

(22) Filed: Jul. 16, 2007

(65) Prior Publication Data
US 2008/0017617 A1    Jan. 24, 2008

(30) Foreign Application Priority Data

Jul. 18, 2006    (JP) .................... 2006-196243

(51) Int. Cl.
*B23K 26/38* (2006.01)
*B41J 11/66* (2006.01)

(52) U.S. Cl. .................. 219/121.67; 700/166

(58) Field of Classification Search ............. 219/121.67; 400/621; 700/166
See application file for complete search history.

(56) References Cited

U.S. PATENT DOCUMENTS

| | | | | |
|---|---|---|---|---|
| 4,384,500 A * | 5/1983 | Friberg | .................. | 700/167 |
| 4,970,600 A * | 11/1990 | Garnier et al. | ................ | 700/166 |
| 5,802,974 A * | 9/1998 | McNeil | .................. | 101/226 |
| 6,191,382 B1 * | 2/2001 | Damikolas | ................ | 219/121.67 |
| 6,209,435 B1 * | 4/2001 | Miyazaki et al. | ................ | 83/665 |
| 6,836,694 B1 * | 12/2004 | Podubrin | .................. | 700/166 |
| 7,278,797 B2 * | 10/2007 | Akaiwa et al. | ................ | 400/613 |
| 7,557,956 B2 * | 7/2009 | Hosokawa | .................. | 358/1.9 |
| 2002/0068668 A1 * | 6/2002 | Chow et al. | .................. | 493/62 |
| 2006/0204309 A1 * | 9/2006 | Gilmour | .................. | 400/621 |
| 2007/0234205 A1 * | 10/2007 | Lloyd et al. | .................. | 715/520 |

FOREIGN PATENT DOCUMENTS

| | | | |
|---|---|---|---|
| JP | 63-230287 A | * | 9/1988 |
| JP | 3-220363 A | * | 9/1991 |
| JP | 08-245049 A | | 9/1996 |
| JP | 2000-94799 A | * | 4/2000 |
| JP | 2000-199930 A | * | 7/2000 |
| JP | 2000-318223 A | * | 11/2000 |
| JP | 2004-130675 A | * | 4/2004 |
| JP | 2004-177685 A | | 6/2004 |
| WO | WO-97/11841 A1 | * | 4/1997 |

OTHER PUBLICATIONS

Machine translation of Japan Patent No. 2000-318,223-A, May 2011.*

Office Action issued in corresponding Japanese Patent Application No. 2006-196243 dated Apr. 26, 2011.

* cited by examiner

*Primary Examiner* — Geoffrey S Evans (74) *Attorney, Agent, or Firm* — Rossi, Kimms & McDowell LLP (57) ABSTRACT

A sheet post-processing apparatus which is capable of reliably producing desired labels and suppressing increases in user office expenses, job time, and environmental load. A laser cutting unit cuts a sheet being conveyed along a sheet conveying path or a sheet discharged onto a post-processing tray, with a laser beam, and a CPU circuit section and a sheet post-processing apparatus control section control the laser cutting unit such that the laser cutting unit cuts a label sheet as the sheet, based on layout information in a label sheet mode of the image forming apparatus.

5 Claims, 7 Drawing Sheets

MAIN SCANNING DIRECTION

SHEET POST-PROCESSING APPARATUS

BACKGROUND OF THE INVENTION

1. Field of the Invention

The present invention relates to a sheet post-processing apparatus, and more particularly to a sheet post-processing apparatus equipped with a function of cutting a sheet material by irradiation with a laser beam.

2. Description of the Related Art

Conventionally, in the case of forming images on a label sheet, it has been required to lay out the images to fit into label positions in respective divisions defined on the label sheet. In this case, label parts on which respective images are arranged are cut off afterward.

A technique of cutting a sheet material has been proposed in Japanese Laid-Open Patent Publication (Kokai) No. H08-245049.

However, in the conventional case where images are formed on a label sheet, the laying out of each image to fit into a label position in a corresponding division defined on the label sheet suffers from the following inconveniences:

Firstly, a lot of trials for aligning image positions with the respective associated label positions are required. For example, in an A4 size label sheet (297 mm×210 mm) commercially available, a label size for each division is generally set to 74.25 mm×42 mm (labels in 4 rows×5 columns). In this case, the position of each image to be printed has to be set in alignment with the label position in the associated division defined at a specific location on the A4 size label sheet.

Secondly, when an image with a desired number of characters or character size cannot be fitted into such a label, it is also required to carry out various trials for correcting imbalance between the size of the label and the character size. Therefore, there is an increasing demand for suppressing increases in user office expenses, job time, and environmental load.

SUMMARY OF THE INVENTION

The present invention provides a sheet post-processing apparatus which is capable of reliably producing desired labels and suppressing increases in user office expenses, job time, and environmental load.

According to the present invention, there is provided a sheet post-processing apparatus for cutting a sheet having an image formed thereon by an image forming apparatus, comprising a laser cutting unit configured to cut a sheet being conveyed along a sheet conveying path or a sheet discharged onto a post-processing tray, with a laser beam, and a control unit configured to control the laser cutting unit such that the laser cutting unit cuts a label sheet as the sheet, based on layout information in a label sheet mode of the image forming apparatus.

With the arrangement of the present invention, it is possible to produce desired labels reliably and suppress increases in user office expenses, job time, and environmental load.

The control unit can have a function of arbitrarily changing laser power of the laser cutting unit.

The control unit can have a function of causing the laser cutting unit to cut only a label part of the label sheet.

The control unit can have a function of causing the laser cutting unit to cut the label sheet in a perforating manner.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
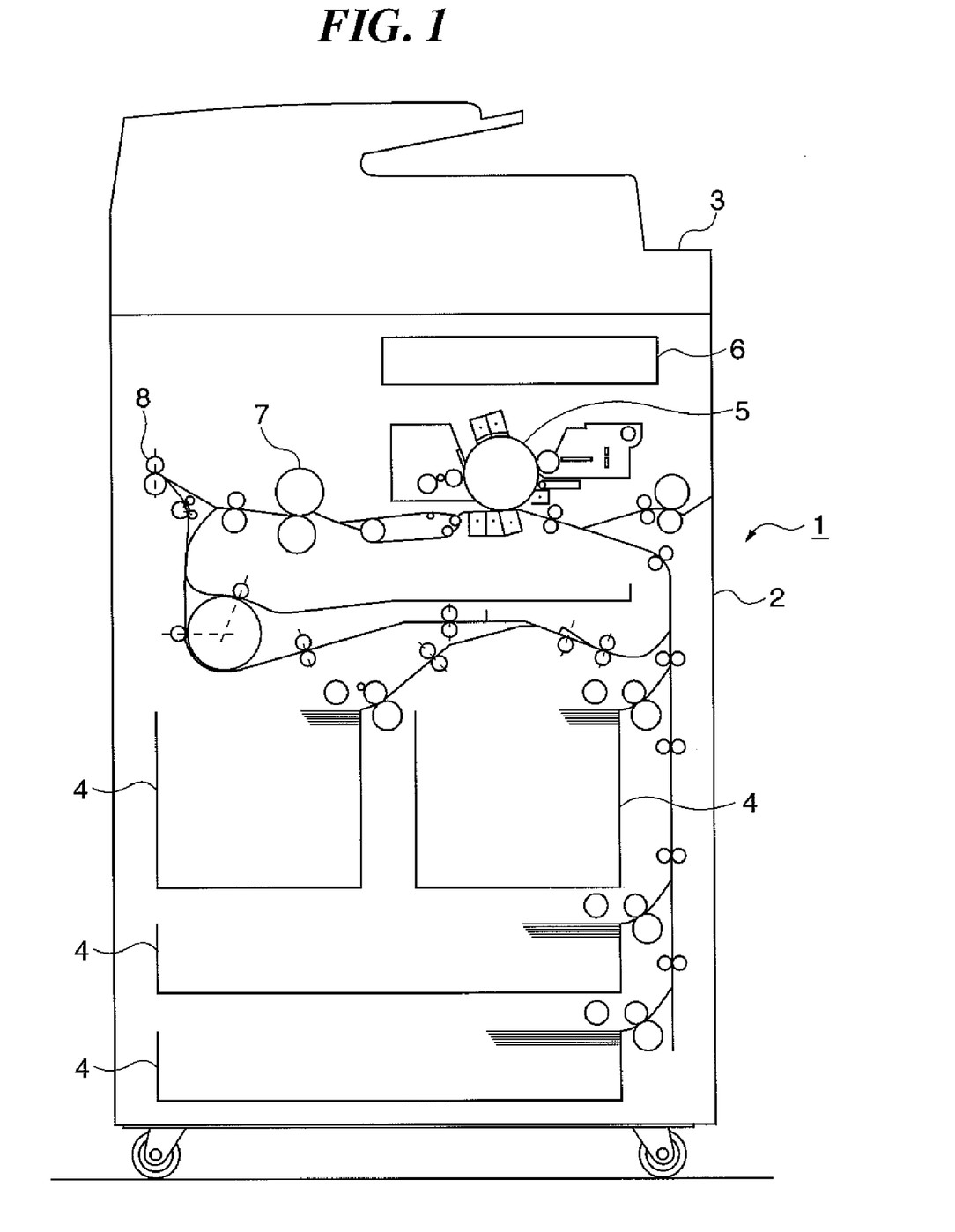
FIG. 1 is a schematic view of an image forming apparatus that feeds sheet materials to a sheet post-processing apparatus.

FIG. 1 is a schematic view of an image forming apparatus that feeds sheet materials to a sheet post-processing apparatus.

Referring to FIG. 1, the image forming apparatus 1 is comprised of a main unit 2 and an original feeder 3. The main unit 2 has a plurality of sheet feeders 4 vertically arranged in a lower portion thereof, and an image forming unit 5 located above the sheet feeders 4 and including a photosensitive drum as a main component. Further, an image reader 6 is disposed above the image forming unit 5. Furthermore, the main unit 2 has a fixing unit 7 disposed downstream of the image forming unit 5 and a discharge roller 8 disposed downstream of the fixing unit 7.

Figure 2:
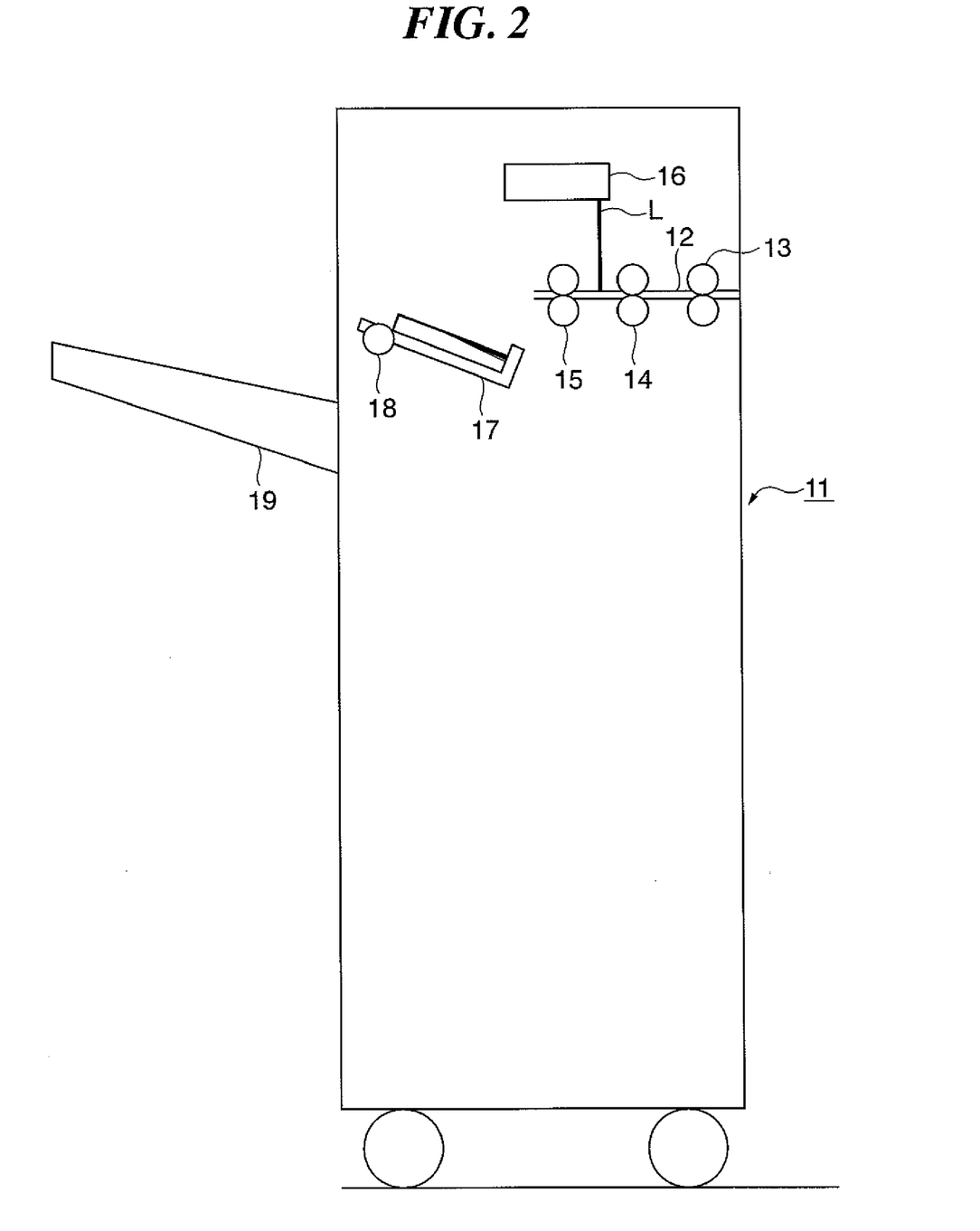
FIG. 2 is a schematic view of a sheet post-processing apparatus according to an embodiment of the present invention.

A sheet fed from one of the sheet feeders 4 is subjected to an image forming process using well-known electrophotography, and is eventually delivered via the discharge roller 8 to the sheet post-processing apparatus shown in FIG. 2.

FIG. 2 is a schematic view of the sheet post-processing apparatus according to the embodiment of the present invention.

Referring to FIG. 2, the sheet post-processing apparatus 11 has a sheet conveying path 12 extending from an inlet thereof, for guiding a sheet received from the image forming apparatus 1 into the sheet post-processing apparatus 11. An inlet roller pair 13, a first conveying roller pair 14, and a second conveying roller pair 15 are arranged along the sheet conveying path 12 in the mentioned order from upstream to downstream.

Above the sheet conveying path 12 is disposed a laser cutting unit 16 such that a laser beam from the laser cutting unit 16 is irradiated onto a sheet on the sheet conveying path 12 between the first conveying roller pair 14 and the second conveying roller pair 15.

A post-processing tray 17 is disposed at a lower location downstream of the second conveying roller pair 15. The post-processing tray 17 is configured as an intermediate tray for temporarily stacking sheets thereon and aligning them. A bundle discharge roller 18 conveys sheets as a bundle from the post-processing tray 17 and discharges the sheet bundle onto a stack tray 19.

Figure 3:
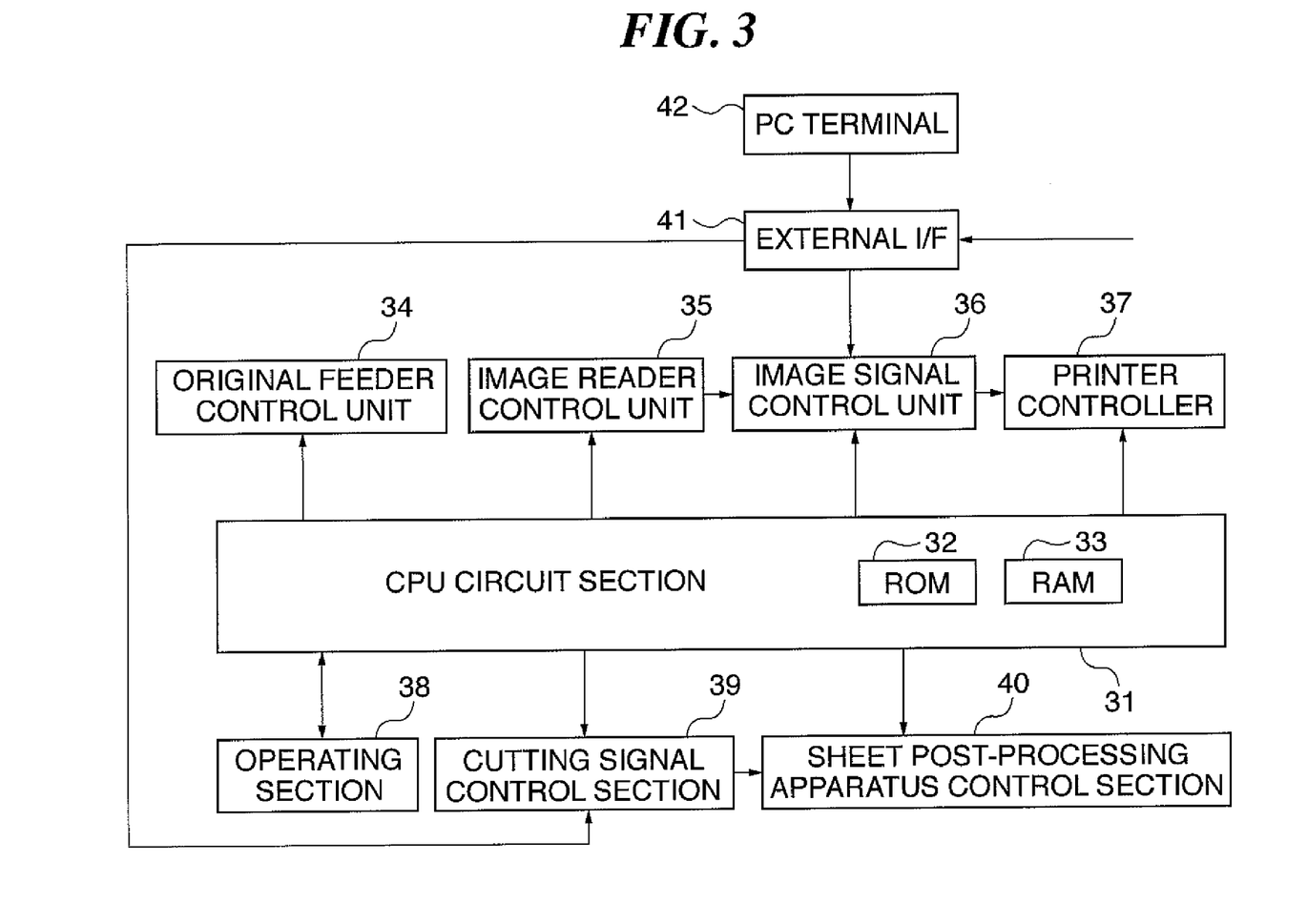
FIG. 3 is a schematic block diagram of a controller of the image forming apparatus shown in FIG. 1.

FIG. 3 is a schematic block diagram of a controller of the image forming apparatus shown in FIG. 1.

Referring to FIG. 3, the controller has a CPU circuit section 31. The CPU circuit section 31 incorporates a CPU (not shown), a ROM 32, and a RAM 33, and performs overall control of blocks 34 to 40 based on a control program read from the ROM 32. The RAM 33 temporarily stores control data, and is also used as a work area for carrying out arithmetic operations involved in control processing.

An original feeder control unit 34 controls the original feeder 3 according to instructions from the CPU circuit section 31. An image reader control unit 35 drivingly controls the image reader 6, and transfers an analog image signal output from an image sensor, not shown, of the image reader 6 to an image signal control unit 36.

The image signal control unit 36 converts the analog image signal from the image sensor into a digital signal, and then performs various kinds of processing on the digital signal. The processed digital signal is converted into a video signal, and the video signal is delivered to the printer controller 37.

The image signal control unit 36 performs various kinds of processing on a digital image signal input from a PC terminal 42 via an external I/F 41. The processed digital image signal is converted into a video signal, and the video signal is delivered to the printer controller 37. The operations executed by the image signal control unit 36 are controlled by the CPU circuit section 31.

The printer controller 37 drives an exposure control unit, not shown, based on the received video signal. An operating section 38 includes a plurality of keys for configuring various functions for image formation and a display section for displaying information indicative of the configurations. The operating section 38 outputs key signals corresponding to operations of the respective keys to the CPU circuit section 31, and displays the corresponding pieces of information on the display section based on signals from the CPU circuit section 31.

A cutting signal control section 39 performs various kinds of processing on a digital cutting signal input from the PC terminal 42 via the external I/F 41, thereby converting the processed digital cutting signal into a video signal, to deliver the video signal to a sheet post-processing apparatus control section 40. The operations executed by the cutting signal control section 39 are controlled by the CPU circuit section 31.

The sheet post-processing apparatus control section 40 drives the laser cutting unit 16, described in detail hereinafter, based on the received video signal. The sheet post-processing apparatus control section 40 is incorporated in the sheet post-processing apparatus 11, and controls the exchange of information with the CPU circuit section 31 to thereby control the overall operation of the sheet post-processing apparatus 11 including the laser cutting unit 16.

Figure 4A:
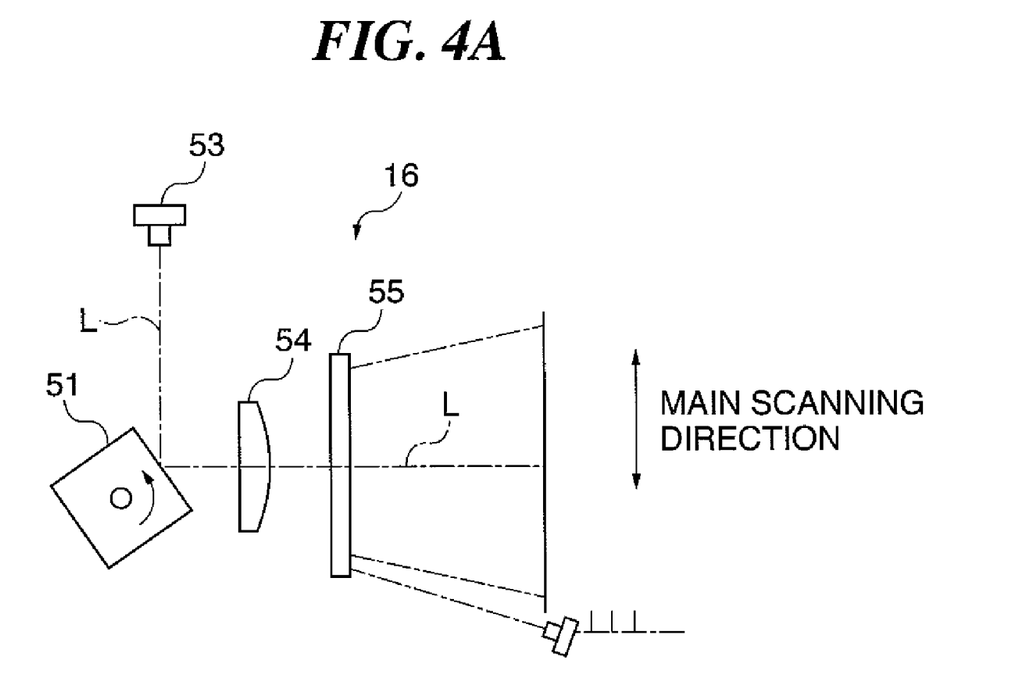
FIGS. 4A and 4B are schematic views of a laser cutting unit appearing in FIG. 2.
Figure 4B:
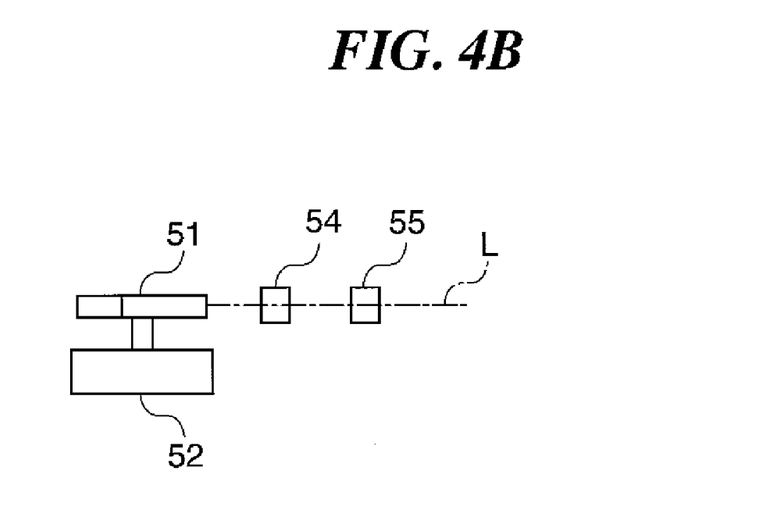

FIGS. 4A and 4B are schematic views of the laser cutting unit appearing in FIG. 2. FIG. 4A is a plan view, and FIG. 4B a side view.

As shown in FIGS. 4A and 4B, the laser cutting unit 16 is comprised of a polygon mirror 51, a polygon motor 52 for driving the polygon mirror 51 for rotation, a laser diode 53 as a light source, and lenses 54 and 55.

In the present embodiment, the polygon mirror 51 is implemented by a four-sided polygon mirror, but the number of the reflective surfaces of the polygon mirror 51 can be changed as required. A laser beam from the laser diode 53 (laser beam L) is irradiated onto the polygon mirror 51.

The polygon mirror 51 is constantly rotating in a direction indicated by an arrow, so that the laser beam L is reflected on the reflective surfaces of the polygon mirror 51 as a deflection beam that continuously changes its reflection angle. The reflected light is subjected to distortion aberration correction and the like by the lenses 54 and 55, and scans the surface of a sheet being conveyed (temporarily stopped) along the sheet conveying path 12, in the main scanning direction.

The surface of each side of the polygon mirror 51 corresponds to one-line scanning, so that the laser beam L emitted from the laser diode 53 scans the surface of the sheet on a line-by-line basis in accordance with the rotation of the polygon mirror 51. The laser cutting unit 16 is configured to be movable in a sheet conveying direction in the sheet post-processing apparatus 11.

With the above-described arrangement, when the laser beam L is irradiated onto a sheet, the sheet irradiated with the laser beam is burned with a scanning width of one line. In the present embodiment, the width of one line is set to 90 μm. The spot diameter of the laser beam has an elliptical shape having a major axis length of 90 μm and a minor axis length of 60 μm, and the minor axis extends in the same direction as that of the scanning.

In scanning a plurality of lines, it is required to make adjacent lines overlap each other. In the present embodiment, the amount of overlap is set to 30 μm, and therefore, e.g. in the case of three-line scanning, the total line width becomes equal to 210 μm. The sheet can be burned with this width, i.e. a cutting width of 210 μm, whereby the sheet can be cut into any of various shapes.

The respective values of the amount of overlap and the major axis length and minor axis length can be changed as required. This makes it possible to perform micro cutting of the sheet by the laser beam L.

With the above configuration, when the user desires to make labels on each of which "company name", "company address", and "telephone number" are printed in respective three lines, the user inputs the three items on a PC, and gives an instruction for execution of a label production mode to the image forming apparatus 1.

Upon reception of this instruction, the image forming apparatus 1 prints the above-mentioned three items on a label sheet following an image forming process. At this time, printout is performed such that a maximum number of labels can be obtained by a combination of labels in columns and labels in rows.

Figure 5A:
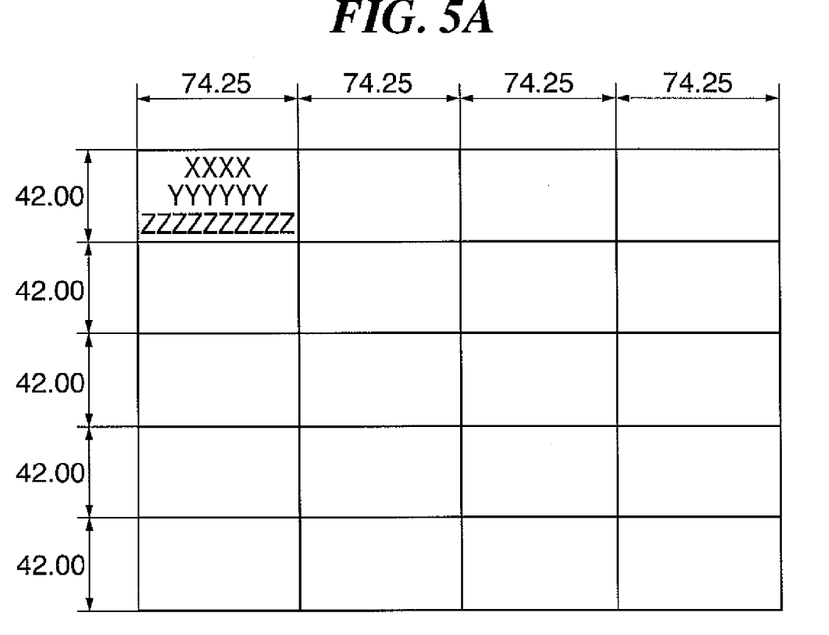
FIGS. 5A and 5B are diagrams useful in explaining label layout.

In the conventional method, if a label size of each division is set to 84×42, the user searches for a suitable label size to set a label size of 74.25×42 (see FIG. 5A), and then adjusts the number of characters and/or the font or character size such that the above-mentioned three items can be fitted in each division. In contrast, in the present embodiment, a layout shown in FIG. 5B by way of example is automatically provided, and printing is performed on the label sheet.

Then, the label sheet is sent to the sheet post-processing apparatus 11. At the same time, the instruction for execution of the label production mode is also transmitted to the sheet post-processing apparatus 11.

The label sheet sent to the sheet post-processing apparatus 11 having received this instruction is cut by being irradiated with the laser beam L according to information on the range of the maximum obtainable number of labels, which was calculated by the image forming apparatus 1. The label sheet is comprised of a label part and a release paper part (support part), and the laser power can be arbitrarily adjusted such that only the label part is cut (for half-cutting) by the laser beam.

The label sheet having undergone the laser cutting process is conveyed as it is through the sheet post-processing apparatus 11, since the release paper has not been cut as described above. It should be noted that the number of labels to be obtained can reduced by configuration of the later-cutting processing by the user.

Conventionally, a punch and die or the like tools have been used to cut a sheet material. However, it is actually impossible to provide the punches and dies to suit the preferences of all users in terms of space, prices, and reasonableness. Further, even if two or three types of punches and dies corresponding to typical shapes are provided, the punches and dies cannot always suit the preferences of users.

To solve these problems, the present embodiment employs the laser beam to cut a sheet into desired shapes. This makes it possible to reduce the size and price of the sheet post-processing apparatus.

Figure 6:
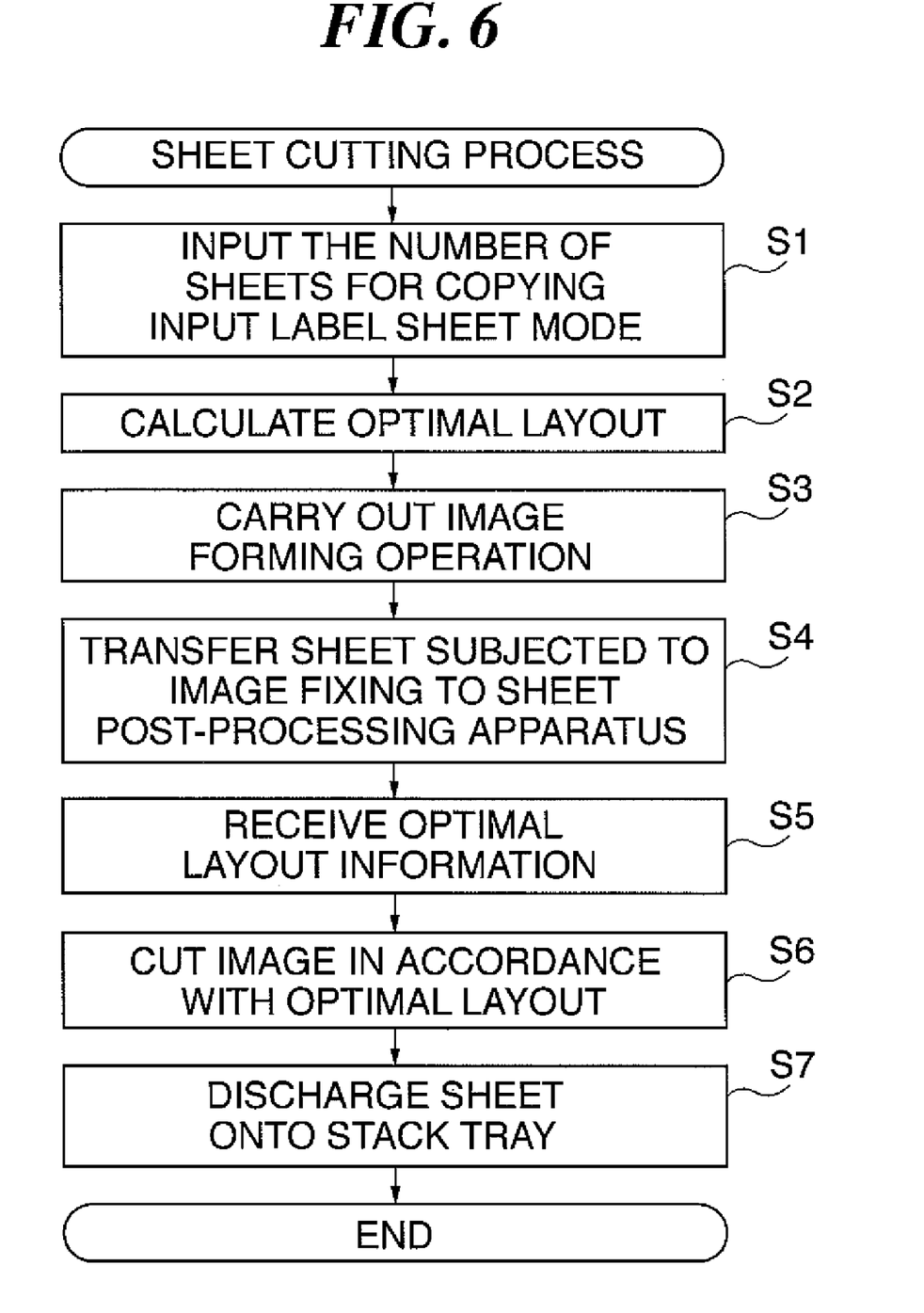
FIG. 6 is a flowchart of a sheet cutting process executed through cooperation of the image forming apparatus shown in FIG. 1 and the sheet post-processing apparatus shown in FIG. 2.

FIG. 6 is a flowchart of the sheet cutting process executed through cooperation of the image forming apparatus shown in FIG. 1 and the sheet post-processing apparatus shown in FIG. 2.

The present process is executed by the CPU circuit section 31 and the sheet post-processing apparatus control section 40 both appearing in FIG. 3.

Referring to FIG. 6, when the user inputs the number of sheets for copying (printing) and the label sheet mode (step S1), an optimal layout is calculated so as to obtain the maximum number of labels (step S2). Then, images are formed on a sheet based on the result of the layout calculation (step S3), and the sheet is conveyed after being subjected to image fixing to the sheet post-processing apparatus 11 (step S4).

At this time, the sheet post-processing apparatus 11 also receives a signal indicative of information on the optimal layout in the label sheet mode (step S5), and therefore an outline part of each image is cut (half-cut) by irradiation with a laser beam from the laser cutting unit 16 (step S6). In the step S6, the laser output from the laser cutting unit 16 is adjusted such that only the label part of the label sheet is laser-cut.

Therefore, the label sheet of which release paper part is not laser-cut is conveyed as it is, and is discharged onto the stack tray 19 (step S7). Thereafter, when the predetermined number of sheets are printed, and the post processing for the sheets is completed, as described above, the present process is terminated. It should be noted that each label sheet having been cut (half-cut) is discharged onto the post-processing tray 17.

Although in the present embodiment, each sheet is cut on the sheet conveying path 12, it may be cut on the post-processing tray 17.

Figure 5B:
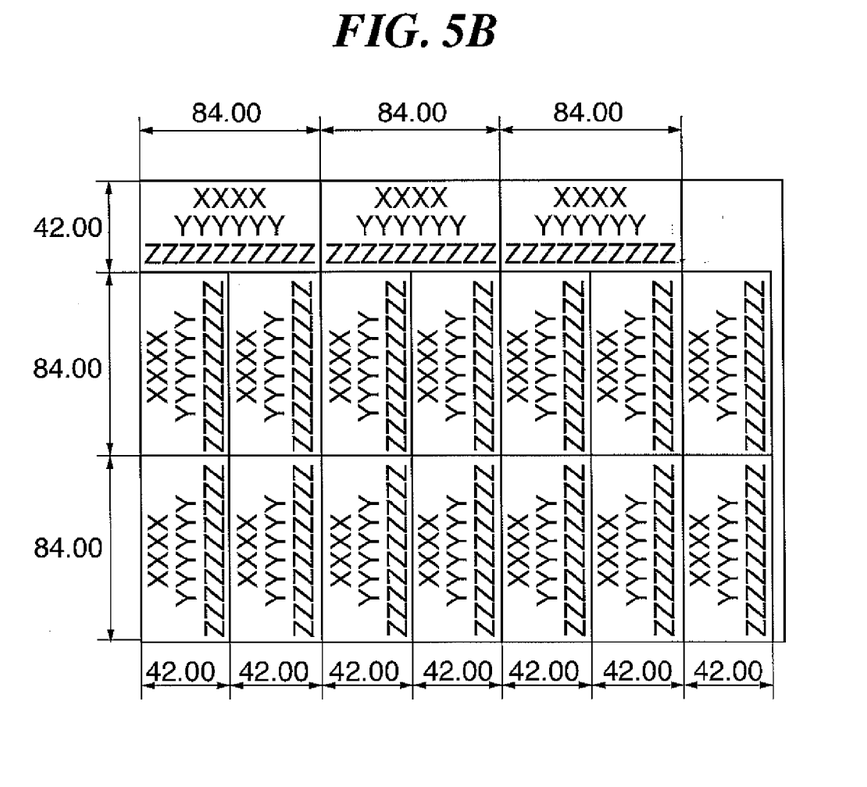
Figure 7:
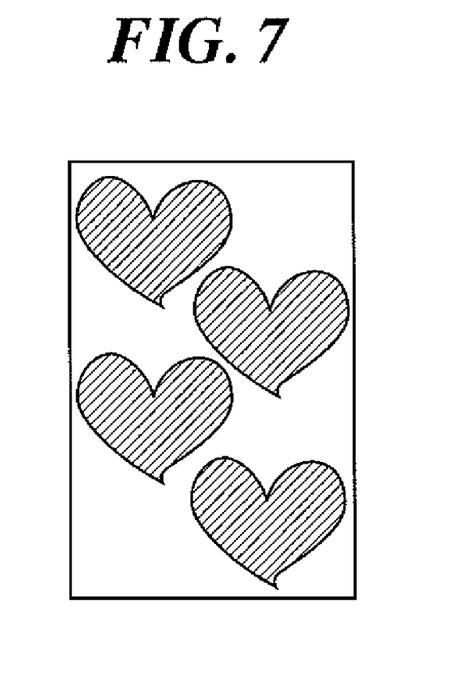
FIG. 7 is a view of laser-cut products (No. 1).

In FIG. 5B, each division has a rectangular shape, but it is possible to conform a shape to be cut to the shape of an image as shown in FIG. 7. At the same time, if the user does not desire to set the maximum obtainable number of labels, the sheet-cutting process can be configured as such by the user instruction.

Figure 8:
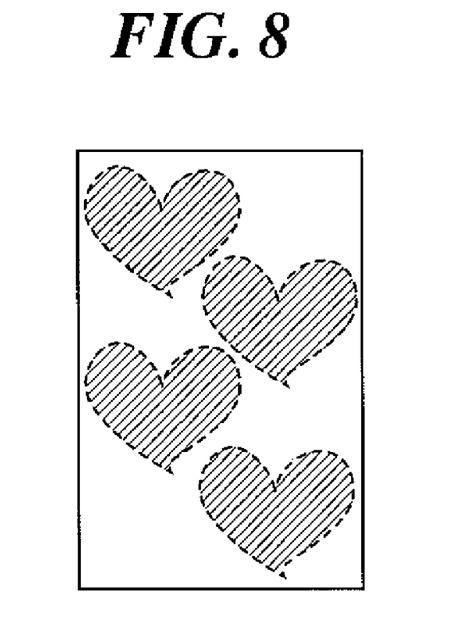
FIG. 8 is a view of laser-cut products (No. 2).

Although in the above-described embodiment, a label sheet is used as a sheet material, it is possible to use an OHP sheet or a sheet having a large basis weight, as a sheet material, and laser-cut the sheet in a perforating manner. In FIG. 8, portions shown by dotted lines are irradiated with laser.

The sheet may be perforated or half-cut on the post-processing tray 17, and then be discharged onto the stack tray 19, or alternatively the sheet can be full-cut into products on the post-processing tray 17. In the latter case, the user can take the products from the post-processing tray 17.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2006-196243 filed Jul. 18, 2006, which is hereby incorporated by reference herein in its entirety.

What is claimed is:

1. An image forming apparatus comprising:
 a controlling unit adapted to determine, when a plurality of label images, each of which is the same image, are aligned to be printed on a label sheet, a layout indicating each position of the plurality of label images, in accordance with a size of the label image and a size of the label sheet;
 a printing unit adapted to print the plurality of label images on the label sheet in accordance with the layout determined by said controlling unit; and
 a cutting unit adapted to cut a top surface of the label sheet; wherein the controlling unit is adapted to control said cutting unit to cut the top surface of the label sheet having the plurality of label images printed thereon in accordance with the layout.

2. An image forming apparatus as claimed in claim 1, wherein said controlling unit determines the layout so as to cause the plurality of label images to fit into the label sheet, in accordance with a horizontal and vertical size of the image inputted by the user and a horizontal and vertical size of the label sheet.

3. An image forming apparatus as claimed in claim 1, wherein said cutting unit irradiates a laser beam on the top surface of the label sheet to cut the top surface thereof, and said controlling unit controls an irradiation position of the laser beam on the top surface of the label sheet in accordance with the layout.

4. An image forming apparatus as claimed in claim 1, wherein said controlling unit controls said cutting unit to cut an outline part of each of the plurality of label images printed on the label sheet in accordance with the layout.

5. An image forming apparatus comprising:
 a controlling unit adapted to determine, when a plurality of label images, each of which is the same image, are aligned to be printed on a label sheet, a layout indicating each position of the plurality of label images, in accordance with a size of the label image and a size of the label sheet;
 an printing unit adapted to print the plurality of label images on the label sheet in accordance with the layout determined by said controlling unit; and
 a cutting unit adapted to cause the label sheet either to be perforated-cut, to be full-cut, or to be half-cut;
 wherein the controlling unit is adapted to control said cutting unit to cause the label sheet, having the plurality of label images formed thereon, either to be perforated-cut, to be full-cut, or to be half-cut in accordance with the layout.

* * * * *